United States Patent
Wells

(10) Patent No.: US 8,132,358 B1
(45) Date of Patent: Mar. 13, 2012

(54) MULCH MAT KIT

(76) Inventor: Terry L. Wells, Mooreville, MS (US)

( * ) Notice: Subject to any disclaimer, the term of this patent is extended or adjusted under 35 U.S.C. 154(b) by 153 days.

(21) Appl. No.: 12/691,829

(22) Filed: Jan. 22, 2010

(51) Int. Cl.
*A01G 13/02* (2006.01)

(52) U.S. Cl. .......................................... 47/21.1; 47/31.1

(58) Field of Classification Search .................. 47/31.1, 47/21.1, 9, 33, 32, 32.4
See application file for complete search history.

(56) References Cited

U.S. PATENT DOCUMENTS

| | | | | |
|---|---|---|---|---|
| 3,018,057 A | * | 1/1962 | Anderson | 239/201 |
| 3,762,642 A | * | 10/1973 | Di Santo | 239/201 |
| 4,268,992 A | * | 5/1981 | Scharf, Sr. | 47/32.4 |
| 4,858,378 A | * | 8/1989 | Helmy | 47/33 |
| 5,085,001 A | | 2/1992 | Crawley | |
| 5,323,557 A | * | 6/1994 | Sonntag | 47/32 |
| 5,367,822 A | | 11/1994 | Beckham | |
| 5,430,971 A | * | 7/1995 | Myer | 47/32 |
| 5,711,106 A | | 1/1998 | Ellis | |
| 5,794,378 A | | 8/1998 | Beatrez | |
| 5,839,222 A | * | 11/1998 | Sittner | 47/32 |
| 5,918,411 A | * | 7/1999 | Hadrava | 47/21.1 |
| 6,076,300 A | | 6/2000 | Cronin | |
| D515,370 S | | 2/2006 | Huegel | |
| 2007/0113473 A1 | | 5/2007 | Sellers, Sr. et al. | |
| 2008/0022588 A1 | | 1/2008 | Tijerina | |
| 2009/0119982 A1 | * | 5/2009 | Gallo et al. | 47/21.1 |

* cited by examiner

*Primary Examiner* — Kristen C Hayes

(57) ABSTRACT

A mulch mat kit designed to retain mulch and to prevent grass around a plant while directly watering the plant root system, the kit including a water permeable base, a wall member attached in an upright position around the base, at least one optional tube removably insertable into the base, and an optional bracket to secure the wall member in an upright position. An aperture centered in the base removably receives a plant stalk therethrough and a slit in the base from the outer perimeter surface to the aperture allows the base to be slipped into place around the plant. The mulch mat kit may be utilized in combination with a sprinkler system in which each tube receives a sprinkler head.

8 Claims, 3 Drawing Sheets

MULCH MAT KIT

BACKGROUND OF THE INVENTION

Various types of landscaping devices are known in the prior art. However, what is needed is a mulch mat kit designed to retain mulch and prevent grass around a plant while directly watering the plant root system. The kit includes a base, a wall member attached in an upright position around the base, and a two-piece bracket which secures the wall member in an upright position. The kit also provides at least one optional tube removably insertable into the base which receives rain water therethrough or water from a hose or watering can to directly water the plant's root system. The base has an aperture centered therethrough for removably receiving a stalk of a plant therethrough and a slit therethrough from the outer perimeter surface to the aperture to allow the base to be slipped into place around the plant. The kit may be utilized in combination with a sprinkler system by connecting the sprinkler heads to the tubes to distribute water to the plant contained within the wall.

FIELD OF THE INVENTION

The present invention relates to landscaping devices, and more particularly, to a mulch mat kit which includes a porous base having a slit therein and a wall member surrounding the base to retain mulch and prevent grass from growing around a plant and which further optionally includes at least one tube removably insertable into the base which receives rain water or water from a hose or watering can therethrough to directly water the plant's root system.

SUMMARY OF THE INVENTION

The general purpose of the present mulch mat kit, described subsequently in greater detail, is to provide a mulch mat kit which has many novel features that result in a mulch mat kit which is not anticipated, rendered obvious, suggested, or even implied by prior art, either alone or in combination thereof.

To accomplish this, the mulch mat kit is utilized with an amount of mulch and may be utilized alone or in combination with a sprinkler system. The kit is designed to retain the mulch around a plant, rather than allowing the mulch to be scattered in a yard, while keeping grass away from the plant and also directly watering the root system of the plant, such as a tree, shrubbery, or other type of plant. The mulch mat kit includes a base, a wall member attached in an upright position around the base, and may also include at least one optional tube removably insertable into the base and an optional two-piece bracket which can be used to secure the wall member in an upright position. The base has a top surface, a bottom surface opposite the top surface, an outer perimeter surface, an aperture centered therethrough for removably receiving a stalk of a plant therethrough and a slit therethrough from the outer perimeter surface to the aperture to allow the base to be slipped into place around the stalk of the plant.

The base and the wall member can be formed of recycled porous rubber or other porous materials suitable which prevent weeds from growing while allowing water to permeate therethrough as well as furthering the other purposes of the present apparatus. One embodiment provides a base that is circular in shape, has a diameter of about 24 inches, and a wall member that has a height in a range of about 5 inches to 5½ inches. The base may be provided in different sizes to fit small or large plants and in different shapes as desired to accommodate different types and sizes of plants or ground conditions or to create a desired aesthetic effect. The base and the wall member may be secured together along the outer perimeter surface of the base with a waterproof construction adhesive. The base and the wall member may be manufactured as a solitary piece or may be molded together.

Another embodiment further has holes each having a diameter of about three-quarters of an inch and each tube having a diameter of about ¾ inch and a height of about 14 inches; provided, however, that the size of the holes and the tubes may vary depending on the size and type of plant being watered utilizing the kit, the sprinkler head, if any, being used, condition of the ground, and weather conditions. The tubes enhance the amount of water and nutrients received by the plant by directing the water and nutrients directly to the root system of the plant which, in turn, promotes a healthy root system and requires less water to maintain a healthy plant. In arid or drought conditions where there is excessive heat and little to no rainfall, the tubes play a vital role in keeping trees and plants alive. Each of the brackets can have a height of 3½ inches and a width of 3½ inches, but the size may vary depending on the size of the wall member. Also, a different type of bracket may be used which will serve the purpose of forming a stable juncture between the two ends of the wall member. Each of the bolts can be 5/16 bolts. The metal components may be formed of galvanized metal to prevent rust. The tubes may be made of PVC pipe to resist decay from contact with the soil.

The present kit may also be utilized in combination with a sprinkler system by connecting sprinkler heads to the tubes to distribute water to the plant's root system.

In addition, a mesh may be attached to the bottom surface of the base between the base and the ground to further assist in the prevention of the growth of weeds and to promote the passage of water therethrough. The mesh may be formed of latex or polyester fibers, or woven coconut fibers.

To use the present mulch mat kit, a user spreads the slit apart and slides the base around the stalk, which may also include a tree trunk, of a plant. The user then places the wall member along the outer perimeter surface of the base in a perpendicular position relative to the base with the first end and the second end of the wall member adjoining at the juncture which is aligned with the slit. The user may then optionally place at least one tube into one of the holes through the ground surface and into the ground and slides the tubes below the water sprinkler heads. Finally, the user covers the base with mulch. If a user desires to utilize the kit in combination with a sprinkler system, in addition to the foregoing, the user would connect the sprinkler heads to the tubes prior to covering the base with mulch, and after connecting the sprinkler heads to the tubes, would cover the base with mulch.

The wall member not only holds mulch therein, but also retains rain water around a plant, thus preventing run-off of water away from a plant, thereby requiring less irrigation water. Also no stakes or spikes must be driven into the ground to hold the wall member in place around the base. Because the mulch is held in place around a plant, the mulch is not scattered by mowers, weed trimmers, or other disturbances, thus saving money spent on additional mulch which would otherwise be required to keep the proper thickness of mulch around the plant to prevent weeds from growing around the plant and to retain water around the plant. The base and wall member are provided in a variety of colors, even colors which match the color of the mulch. The installation of the present mulch mat kit components is easy.

Thus has been broadly outlined the more important features of the present mulch mat kit and method so that the detailed description thereof that follows may be better understood and in order that the present contribution to the art may be better appreciated.

Numerous objects, features and advantages of the present mulch mat kit will be readily apparent to those of ordinary skill in the art upon reading the following detailed description of presently preferred, but nonetheless illustrative, examples of the present mulch mat kit and method when taken in conjunction with the accompanying drawings. In this respect, before explaining the current examples of the present mulch mat kit and method in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the mulch mat kit and method. It is therefore important that the claims be regarded as including such equivalent constructions insofar as they do not depart from the spirit and scope of the present invention.

Objects of the present mulch mat kit and method, along with various novel features that characterize the invention are particularly pointed out in the claims forming a part of this disclosure. For better understanding of the mulch mat kit and method, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
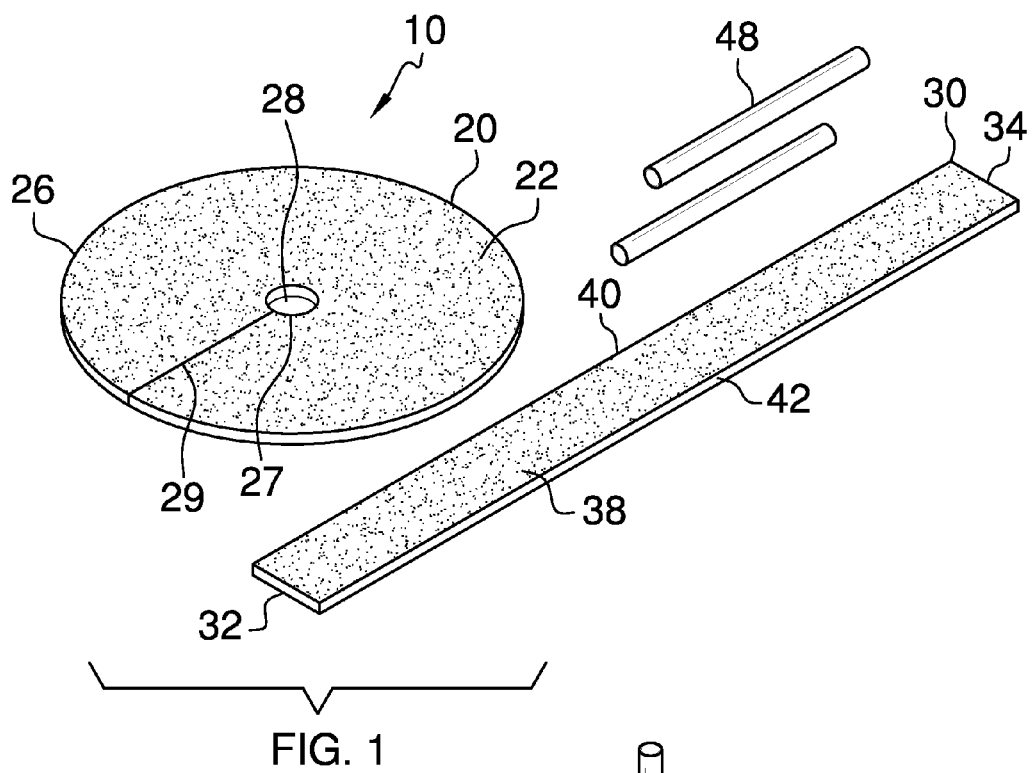
FIG. 1 is an isometric view of a base, a tube, and a wall member.
Figure 2:
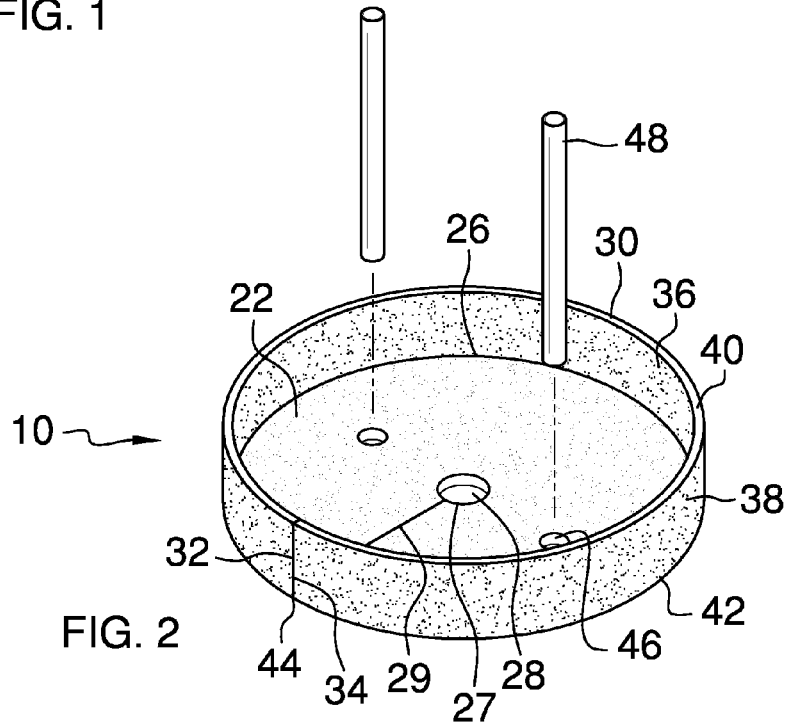
FIG. 2 is an exploded isometric view illustrating the assembly of the base, the tube, and the wall member.
Figure 3:
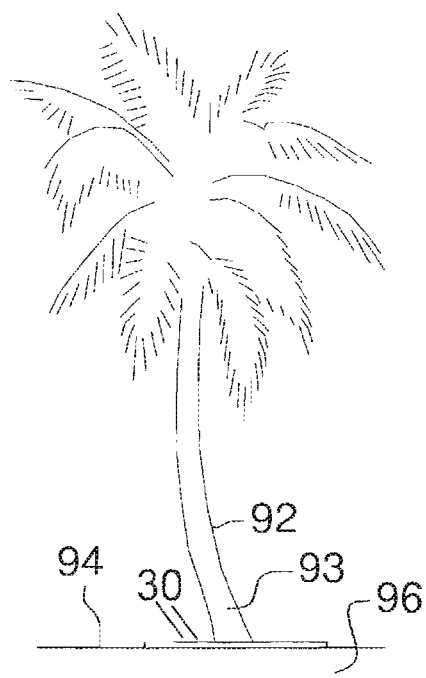
FIG. 3 is an in-use side elevation view illustrating the placement of a plant within a wall member.
Figure 4:
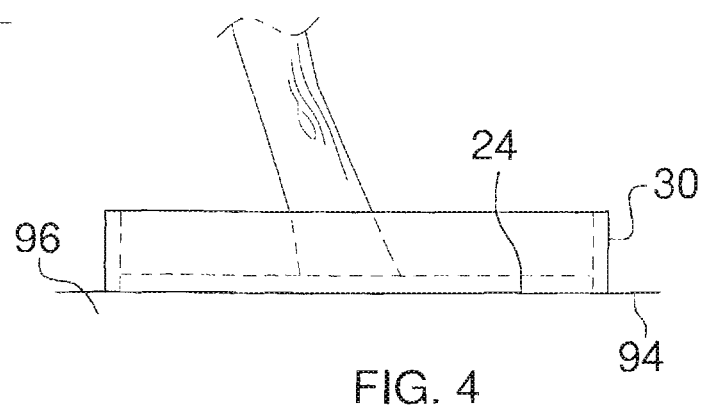
FIG. 4 is an enlarged in-use side elevation view illustrating the placement of a plant stalk within a wall member.
Figure 5:
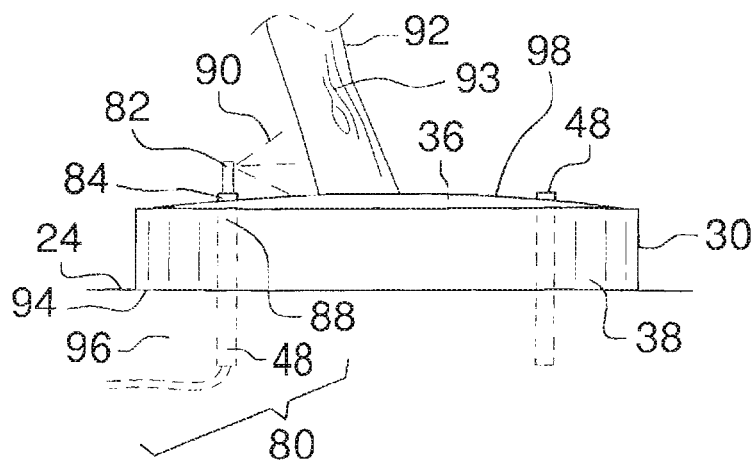
FIG. 5 is an in-use side elevation view illustrating the insertion of a sprinkler head through a tube.
Figure 6:
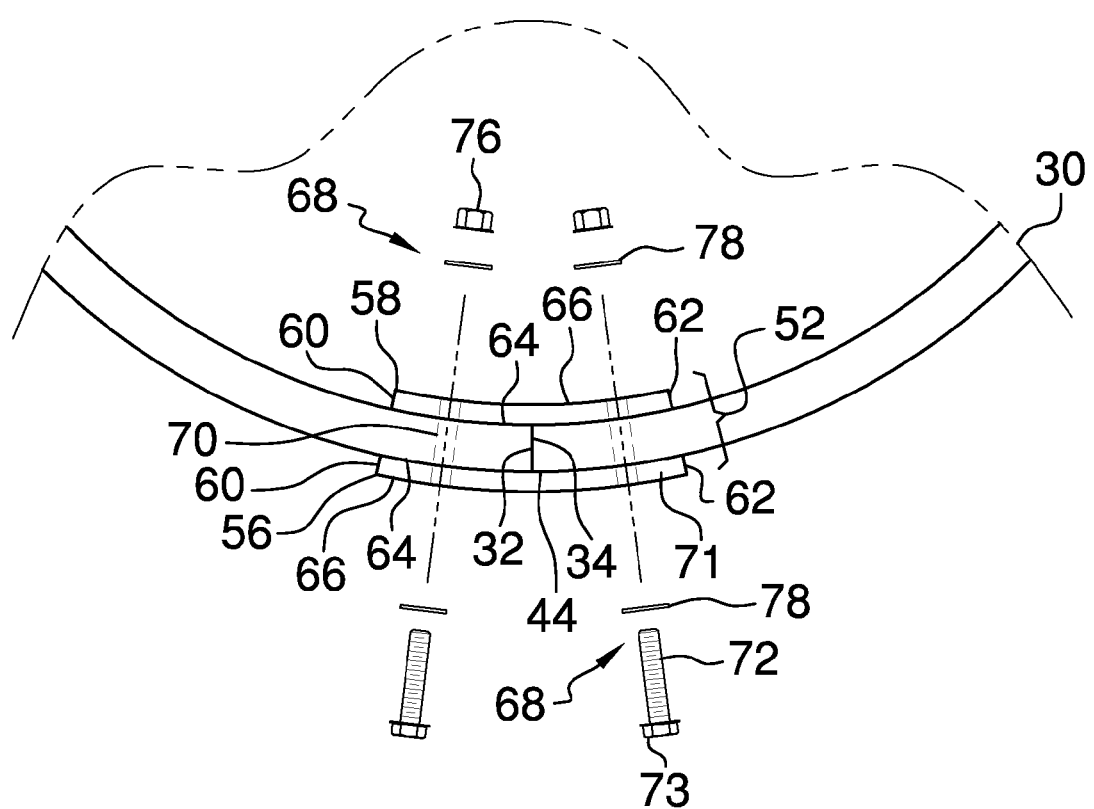
FIG. 6 is a top plan view illustrating the attachment of a bracket to the wall member.

With reference now to the drawings, and in particular FIGS. 1 through 6 thereof, example of the instant mulch mat kit employing the principles and concepts of the present mulch mat kit and generally designated by the reference number 10 will be described.

Referring to FIGS. 1 through 6, the present mulch mat kit 10 is illustrated. The mulch mat kit 10 is utilized in combination an amount of mulch 98 and is designed to retain the mulch 98 around a plant 92, rather than allowing the mulch 98 to be scattered in a yard, while keeping grass away from the plant 92 and also directly watering the root system of the plant 92. The plant may be a tree, shrubbery, or other type of plant. The mulch mat kit 10 includes a water permeable base 20 and a wall member 30 attached to the base 20. The kit 10 also may optionally include at least one tube 48 removably insertable into the base 20. A bracket 52 can be used to secure the wall member 30 in an upright position. The base 20 has a top surface 22, a bottom surface 24 opposite the top surface 22, and an outer perimeter surface 26. An aperture 28 is centered in the base 20. The aperture 28 runs through the top surface 22 and the bottom surface 24. The aperture 28 removably receives a stalk 93 of a plant 92 therethrough. In addition, a slit 29 is disposed through the base 20 top surface 22 and bottom surface 24. The slit 29 runs from the outer perimeter surface 26 to the aperture 28. The slit 29 allows the base 20 to be slipped into place around a plant 92.

The parallelepiped wall member 30 has a first end 32, a second end 34 opposite the first end 32, an interior side 36 disposed between the first end 32 and the second end 34, an exterior side 38 opposite the interior side 36, a top side 40, and a bottom side 42 opposite the top side 40. The wall member 30 is continuously disposed along the outer perimeter surface 26 in a perpendicular position relative to the base 20. The first end 32 and the second end 34 adjoin at a juncture 44 with the juncture 44 disposed in alignment with the slit 29. At least one hole 46 is disposed through the top surface 22 and bottom surface 24 of the base 20. Each hole 46 can be disposed on an opposite side of the aperture 28 and spaced apart from the slit 29. The holes 46 may be disposed on opposite sides of the aperture 28 for an even distribution of water 90 on a plant 92 and spaced apart from the slit 29 to provide a stronger base 20 than if the holes 46 were disposed in a location near the slit 29. A tube 48 can be removably inserted into each hole 46.

The bracket 52 may be two-pieced and includes an outer side wall 56 and an identical inner side wall 58. Each of the outer and inner side walls 56, 58 have a first outer edge 60, a second outer edge 62, an internal side 64, and an external side 66. The internal side 64 of the outer side wall 56 is attached to the exterior side 38 of the wall member 30 with the juncture 44 being centered midway between the first outer edge 60 and the second outer edge 62. The internal side 64 of the inner side wall 58 is attached to the interior side 26 of the wall member 30 opposite the internal side 64 of the outer side wall 56. The outer side wall 56 and the inner side wall 58 secure the first end 32 and the second end 34 of the wall member 30 in a position adjacent to each other. An opening 70 runs through a horizontal axis 71 near a top edge 69 of each of the bracket outer and inner side walls 56, 58 and another opening 70 below the top edge 69 of each of the bracket outer and inner side walls 56, 58.

A securement means 68 secures the outer side wall 56 and the inner side wall 58 together. The securement means 68 can include of a bolt 72 removably inserted into the external side 66 of the outer side wall 56 and through the opening 70 and a nut 76 removably attached to the bolt 72 adjacent to the external side 66 of the inner side wall 58. The securement means 68 can also include a pair of washers 78 attached to each bolt 72. One of the washers 78 disposed between the bolt head 73 and the external side 66 of the outer side wall 56 and one of the washers 78 disposed between the external side 66 of the inner side wall 58 and the nut 76.

However, the base 20 and the wall member 30 may be secured together along the outer perimeter surface 26 of the base 20 utilizing with a waterproof construction adhesive. The base 20 and the wall member 30 may be manufactured as two separate pieces or as a solitary piece and may be molded together with the slit 29 and juncture 44 being cut therethrough either as part of the manufacturing process or prior to installation around a plant 92.

An amount of mulch 98 completely covers the top surface 22 of the base 20.

The present kit 10 can also be utilized in combination with a sprinkler system 80 in which each tube 48 removably receives a sprinkler head 82 of a sprinkler system 80 therethrough and permits the direct watering of a plant's 92 root system. A lower end 84 of each sprinkler head 82 is removably attached to an upper end 88 of one of the tubes 48. Each tube 48 extends through the ground surface 94 and into the ground 96 beneath the base 20.

The base 20 and the wall member 30 can be formed of recycled rubber or other materials suitable which prevent weeds from growing while allowing water to permeate therethrough as well as furthering the other purposes of the present apparatus.

One embodiment provides a base 20 that is circular in shape, has a diameter of about 24-inches, and a wall member that has a height in a range of about 5 inches to 5½ inches. Another embodiment further has holes 46 each having a diameter of about three-quarters of an inch and each tube 48 having a diameter of about ¾ inch and a height of about 14 inches; however the size of each hole 46 and each tube 48 may vary depending on the size and type of plant 92, the sprinkler head 82, if any, being used, condition of the ground 96, and weather conditions. Each of the brackets 52 can have a height of 3½ inches and a width of 3½ inches. Each of the bolts 72 can be 5/16 bolts.

Use:

To use the present mulch mat kit 10, a user spreads the slit 29 apart and slides the base 20 around the stalk 93 of a plant 92. If the user desires to utilize the optional wall member 30, the user then places the wall member 30 along the outer perimeter surface 26 of the base 20 in a perpendicular position relative to the base 20 with the first end 32 and the second end 34 of the wall member 30 adjoining at the juncture 44 which is aligned with the slit 29. The user then places the tubes 48 into the holes 46 through the ground surface 94 and into the ground 96 and slides the tubes 48 below the water sprinkler heads 82. Finally, the user covers the base 20 with mulch 98.

With respect to the above description then, it is to be realized that the optimum dimensional relationships for the parts of the present mulch mat kit to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A mulch mat kit comprising:
   a water permeable base;
   a top surface of the base;
   a bottom surface of the base opposite the top surface;
   an outer perimeter surface;
   an aperture centered in the base, the aperture running through the top surface and the bottom surface, wherein the aperture slidably receives a plant therethrough;
   a slit disposed through the base top surface and bottom surface, the slit running from the outer perimeter surface to the aperture;
   a plurality of holes disposed through the top surface and bottom surface of the base;
   a parallelepiped wall member comprising
      a first end;
      a second end opposite the first end;
      an interior side disposed between the first end and the second end;
      an exterior side opposite the interior side;
      a top side;
      a bottom side opposite the top side;
   wherein the wall member is continuously disposed along the outer perimeter surface in a perpendicular position relative to the base;
   wherein the first end and the second end adjoin at a juncture, the juncture disposed in alignment with the slit;
   wherein an amount of mulch completely covers the top surface of the base;
   at least one tube removably inserted into one of the holes;
   a bracket securing the first end and the second end of the wall member in a position adjacent to each other at the juncture;
   wherein the bracket comprises:
      a two-pieced bracket further comprising
         an outer side wall;
         an inner side wall identical to the outer side wall, each of the inner and outer side walls having a first outer edge, a second outer edge, an internal side, and an external side, the internal side of the outer side wall attached to the exterior side of the wall member wherein the juncture is centered midway between the first outer edge and the second outer edge, the internal side of the inner side wall attached to the interior side of the wall member opposite the internal side of the outer side wall, the outer side wall and the inner side wall securing the first end and the second end of the wall member in a position adjacent to each other;
         an opening running through a horizontal axis near a top edge of each of the bracket outer and inner side walls and another opening below the top edge of each of the bracket outer and inner side walls.

2. The mulch mat kit of claim 1 further comprising a securement means securing the outer side wall and the inner side wall of the bracket together wherein the securement means comprises:
   a bolt removably inserted into the external side of the outer side wall and through each of the openings; and
   a nut removably attached to the bolt adjacent to the external side of the inner side wall;
   a pair of washers attached to each bolt, one of the washers disposed between the bolt head and the external side of the outer side wall and one of the washers disposed between the external side of the inner side wall and the nut.

3. The mulch mat kit of claim 2 wherein the base and the wall member are formed of a unitary construction.

4. The mulch mat kit of claim 2 wherein the base and the wall member are formed of a separate two-piece construction.

5. A mulch mat kit utilized in combination with a sprinkler system, the mulch mat kit comprising:
   a base;
   a top surface of the base;

a bottom surface of the base opposite the top surface;
an outer perimeter surface;
an aperture centered in the base, the aperture running through the top surface and the bottom surface, wherein the aperture slidably receives a plant therethrough;
a slit disposed through the base top surface and bottom surface, the slit running from the outer perimeter surface to the aperture;
a plurality of holes disposed through the top surface and bottom surface of the base;
a parallelepiped wall member comprising
a first end;
a second end opposite the first end;
an interior side disposed between the first end and the second end;
an exterior side opposite the interior side;
a top side;
a bottom side opposite the top side;
wherein the wall member is continuously disposed along the outer perimeter surface in a perpendicular position relative to the base;
wherein the first end and the second end adjoin at a juncture, the juncture disposed in alignment with the slit;
a bracket securing the first end and the second end of the wall member in a position adjacent to each other at the juncture;
wherein an amount of mulch completely covers the top surface of the base;
at least one tube removably inserted into one of the holes;
wherein each tube removably receives a sprinkler head of a sprinkler system therethrough;
wherein a lower end of each sprinkler head is removably attached to an upper end of one of the tubes, each tube extending through the ground surface and into the ground beneath the base;
wherein the base and the wall member are formed of a unitary construction;
wherein the bracket comprises a two-pieced bracket further comprising:
an outer side wall;
an inner side wall identical to the outer side wall, each of the inner and outer side walls having a first outer edge, a second outer edge, an internal side, and an external side, the internal side of the outer side wall attached to the exterior side of the wall member wherein the juncture is centered midway between the first outer edge and the second outer edge, the internal side of the inner side wall attached to the interior side of the wall member opposite the internal side of the outer side wall, the outer side wall and the inner side wall securing the first end and the second end of the wall member in a position adjacent to each other;
an opening running through a horizontal axis near a top edge of each of the bracket outer and inner side walls and another opening below the top edge of each of the bracket outer and inner side walls.

6. The mulch mat kit of claim 5 further comprising a securement means securing the outer side wall and the inner side wall of the bracket together wherein the securement means comprises:
a bolt removably inserted into the external side of the outer side wall and through each of the openings; and
a nut removably attached to the bolt adjacent to the external side of the inner side wall;
a pair of washers attached to each bolt, one of the washers disposed between the bolt head and the external side of the outer side wall and one of the washers disposed between the external side of the inner side wall and the nut.

7. A mulch mat kit utilized in combination with a sprinkler system, the mulch mat kit comprising:
a base:
a top surface of the base;
a bottom surface of the base opposite the top surface;
an outer perimeter surface;
an aperture centered in the base, the aperture running through the top surface and the bottom surface, wherein the aperture slidably receives a plant therethrough;
a slit disposed through the base top surface and bottom surface, the slit running from the outer perimeter surface to the aperture;
a plurality of holes disposed through the top surface and bottom surface of the base;
a parallelepiped wall member comprising
a first end;
a second end opposite the first end;
an interior side disposed between the first end and the second end;
an exterior side opposite the interior side;
a too side;
a bottom side opposite the top side;
wherein the wall member is continuously disposed along the outer perimeter surface in a perpendicular position relative to the base;
wherein the first end and the second end adjoin at a juncture, the juncture disposed in alignment with the slit;
a bracket securing the first end and the second end of the wall member in a position adjacent to each other at the juncture;
wherein an amount of mulch completely covers the too surface of the base;
at least one tube removably inserted into one of the holes;
wherein each tube removably receives a sprinkler head of a sprinkler system therethrough;
wherein a lower end of each sprinkler head is removably attached to an upper end of one of the tubes, each tube extending through the ground surface and into the ground beneath the base;
wherein the base and the wall member are separately formed;
wherein the bracket comprises a two-pieced bracket further comprising:
an outer side wall;
an inner side wall identical to the outer side wall, each of the inner and outer side walls having a first outer edge, a second outer edge, an internal side, and an external side, the internal side of the outer side wall attached to the exterior side of the wall member wherein the juncture is centered midway between the first outer edge and the second outer edge, the internal side of the inner side wall attached to the interior side of the wall member opposite the internal side of the outer side wall, the outer side wall and the inner side wall securing the first end and the second end of the wall member in a position adjacent to each other;
an opening running through a horizontal axis near a top edge of each of the bracket outer and inner side walls and another opening below the top edge of each of the bracket outer and inner side walls.

8. The mulch mat kit of claim 7 further comprising a securement means securing the outer side wall and the inner side wall of the bracket together wherein the securement means comprises:

a bolt removably inserted into the external side of the outer side wall and through each of the openings; and a nut removably attached to the bolt adjacent to the external side of the inner side wall;

a pair of washers attached to each bolt, one of the washers disposed between the bolt head and the external side of the outer side wall and one of the washers disposed between the external side of the inner side wall and the nut.

* * * * *